United States Patent [19]

Wood

[11] Patent Number: 5,288,783
[45] Date of Patent: Feb. 22, 1994

[54] PREPARATION OF SALT OF POLYASPARTIC ACID BY HIGH TEMPERATURE REACTION

[75] Inventor: Louis L. Wood, Rockville, Md.

[73] Assignee: Srchem Incorporated, Elkridge, Md.

[21] Appl. No.: 7,376

[22] Filed: Jan. 21, 1993

Related U.S. Application Data

[63] Continuation-in-part of Ser. No. 882,919, May 14, 1992, abandoned.

[51] Int. Cl.$^5$ ............................................. C08G 69/00
[52] U.S. Cl. .................................... 525/418; 525/419; 525/420; 525/539; 528/363; 528/392
[58] Field of Search ................ 528/363, 392; 525/418, 525/419, 420, 539

[56] References Cited

U.S. PATENT DOCUMENTS

| | | | |
|---|---|---|---|
| 3,846,380 | 11/1974 | Fujimoto et al. | 260/78 A |
| 4,696,981 | 9/1987 | Harada et al. | 525/328.2 |
| 4,839,461 | 6/1989 | Boehmke | 528/363 |
| 5,077,597 | 10/1991 | Koskan | 528/328 |
| 5,152,902 | 10/1992 | Koskan et al. | 210/698 |

OTHER PUBLICATIONS

Dessaignes, Quartley Journal of The Chemical Society of London, vol. 3, reprinted Jun. 1950, Translation of Comp. Rendu XXX, 324.

Frankel et al. J. Org. Chem., 16, 1513, Jun. 1951, Synthesis of polyaspartic acid.

Kovacs et al. J. Org. Chem. 25, 1084, Jun. 1961, Chemical Studies of polyaspartic acids.

Harada et al. Origins Prebiol. systems Their Mol. Matrices, Proc. Conf Wakulla Springs, Fla., 289, Jun. 1963, Abstract.

Sarig et al., The use of polymers for retardation of scale formation, Natl. Counc. Res. Dev. (Rep.) (Isr.), 150, Jun. 1977.

*Primary Examiner*—Harold D. Anderson
*Attorney, Agent, or Firm*—William S. Ramsey

[57] ABSTRACT

Polyaspartate, useful or inhibition of incrustations due to materials causing hardness in water and of value in detergent formulations, can be prepared by reacting maleic acid or fumaric acid in a molar ratio of 1:1-2.1 at temperatures greater than 170° C., followed by conversion of the polymer formed in this reaction to a salt of polyaspartic acid by basic hydrolysis.

9 Claims, 8 Drawing Sheets ved by reacting maleic
PREPARATION OF SALT OF POLYASPARTIC ACID BY HIGH TEMPERATURE REACTION This application is a continuation-in-part, of application Ser. No. 7/882,919, filed May 14, 1992, now abandoned.

FIELD OF THE INVENTION

This invention relates to a process for the production of polyaspartic acid and its salts and the use of these materials.

DESCRIPTION OF RELATED ART

The salts of polyaspartic acid have been used for fertilizers, and scale inhibition agents. They are particularly useful for the prevention of scale deposition in boiler water, reverse osmosis membranes and in detergents. One of the primary characteristics that makes them valuable in this respect is the fact that they are readily biodegradable, whereas other materials that are presently used for this purpose are either slowly biodegradable, e.g. polyacrylic acid, or harmful to the environment, e.g. polyphosphoric acid.

Sodium polyaspartate was used in the prevention of boiler scale by changing the crystal structure of calcium salts resulting in the formation of a soft scale (Sarig et al, The use of polymers for retardation of scale formation. Natl Counc Res. Dev [Rep] (Isr.), 150, 1977). Polyaspartic acid, molecular weight (MW) 6,000, was found to be superior to polyglutamate, MW 14,400, polyvinyl sulfonate, MW 5300, and polyacrylic acid, MW 6,000, in that it gave 66% retardation of total scale and 90% retardation of calcium sulfate scale. In addition, the scale formed in the presence of polyaspartate was softer than that produced in the presence of polyacrylate, polyglutamate and polyvinyl sulfonate.

U.S. Pat. No. 4,839,461 discloses a method for making polyaspartic acid from maleic acid and ammonia by reacting these constituents in a 1:1-1.5 molar ratio by raising the temperature to 120°-150° C. over a period of 4-6 hours and maintaining it for 0-2 hours. It is further disclosed that temperatures above 140°-160° C. result in elimination of $CO_2$, thus teaching degradation of the material. The molecular weight range obtained by this method was said to be 1,000-4,000 with a cluster at 1,800-2,000. That patent states that this material is useful in the prevention of tarnishing glass and porcelain articles. Although not stated in this patent, it is known that this action would occur as a result of the inhibition of calcium sulfate deposition. Harada, et al (Thermal polycondensation of free amino acids with polyphosphoric acid. Origins Prebiol. systems Their Mol Matrices, Proc. Conf., Wakulla Springs, Fla., 289, 1963) obtained polyaspartic acid from aspartic acid and phosphoric acid at temperatures over 100° C. over a time period of 50-250 hrs, but required temperatures over 170° without phosphoric acid being present.

U.S. Pat. No. 5,057,597 discloses a method for the polycondensation of aspartic acid to produce polyaspartic acid by heating the aspartic acid in a fluidized bed reactor to 221° C. for a period of 3-6 hours in a nitrogen atmosphere followed by conventional alkaline hydrolysis.

Kovacs et al. (J. Org. Chem., 25 1084 [1961]) prepared polyaspartic acid by heating aspartic acid to 200° C. In vacuo for a period of 120 hours or in boiling tetralin over a period of 100 hours. Kovacs et al, showed that the intermediate formed in the thermal polymerization of aspartic acid was polysuccinimide.

Frankel et al. (J. Org. Chem., 16, 1513 [1951]) prepared polyaspartic acid by heating the benzyl ester of N-carboxyanhydroaspartic acid followed by saponification.

Dessaigne (Comp. rend. 31, 432-434 [1850]) prepared condensation products which gave aspartic acid on treatment with nitric or hydrochloric acid by dry distillation of the acid ammonium salts of malic fumaric or maleic acid at unspecified times and temperatures.

SUMMARY OF THE INVENTION

Polymers of aspartic acid which are suitable for the prevention of scale may be obtained by reacting maleic acid and ammonia in a molar ratio of 1:1-2.1 at 170°-350° C. and then converting the polysuccinimide formed to a salt of polyaspartic acid by hydrolysis with an alkaline-earth or alkali metal hydroxide or with ammonium hydroxide. Alkaline-earth and alkali metal hydroxides include magnesium, calcium, strontium, barium, lithium, sodium, and potassium hydroxides. The reaction is carried out by the addition of water to maleic anhydride, thus forming maleic acid, or to maleic acid followed by addition of the appropriate amount of ammonium in the form of gaseous ammonia or as its aqueous solution. This solution is then heated to remove water. A melt of the maleic acid and ammonia is formed and water removal continues as the reaction proceeds and the temperature is brought to 170°-350° C. When the theoretical quantity of water formed in the production of polysuccinimide has been removed, which may occur in less than 5 minutes, the reaction mixture is allowed to cool. The polysuccinimide formed can be used to make other useful products or can be hydrolyzed with metal hydroxides to provide the appropriate salt of polyaspartic acid. Solutions of the salts of polyaspartic acid formed in this manner have the same scale inhibition performance and molecular weight range as do the polymers formed by the thermal polymerization of aspartic acid itself. Further manipulation to remove the water or the salts can be carried out to provide water free powders of the salts or the free acid. Polymers of polyaspartic acid also may be formed in an analogous process by reacting fumaric acid and ammonia in a molar ratio of 1:1-2.1 at 200°-300° C. and then converting the polysuccinimide formed to a salt of polyaspartic acid by hydrolysis with an alkaline-earth or alkali metal hydroxide or with ammonium hydroxide.

The polyaspartic acid provided by the present invention is suitable for inhibition of scale deposition, whereas the methods previously used to produce polyaspartic acid did not provide a polymer of sufficient molecular weight to prevent scale formation.

The object of this invention is to provide a means of preparing polysuccinimide. A further object of this invention is to provide a means of preparing salts of polyaspartic acid.

DETAILED DESCRIPTION OF THE EMBODIMENTS

As opposed to the teachings of U.S. Pat. No. 4,839,461, I have found that, although the use of the polyaspartic made by the process is said to be useful in the prevention of hardness deposits, no actual experimentation to confirm this finding is reported. In fact, upon careful repetition of the procedures of U.S. Pat. No. 4,839,461, the results below clearly demonstrate that polymers of aspartic acid prepared by heating the ammonium salts of maleic acid at 140°–150° C. for 4 to 6 hours did not give a polymer that was active as a calcium scale inhibitor. Further, when calculations of the theoretical weight of polysuccinimide (molecular weight 97) formed in Example 1 indicates that the reaction was not to completion under the conditions described.

EXAMPLE 1

Thermal Polymerization of L-Aspartic Acid at 240°–250° C.

Aspartic acid, 133 g, was tumbled under nitrogen at 100 Torr, at 240°–250° C. for 1.5 hours to give a pink powder weighing 97.3 g. This solid was slurried in 200 ml of water at 25° C. and a solution of 40 g of water containing 40.0 g of sodium hydroxide was added over a period of 15 minutes with intermittant cooling to keep the temperature between 60° and 70° C. The resultant clear red-brown solution, pH 12.0, was adjusted to pH 7.0 by the addition of 1.5 g of citric acid and contained 25% solids.

The sodium polysparte was tested for inhibition of calcium carbonate precipitation by the calcium drift assay. In this assay a supersaturated solution of calcium carbonate is formed by adding 29.1 ml of 0.55M NaCl and 0.01M KCl to 0.15 ml of 1.0M $CaCl_2$ and 0.3 ml of 0.5M $NaHCO_3$. The reaction is initiated by adjusting the pH to 7.5–8.0 by titration with 1N NaOH and addition of the material to be tested for inhibition of $CaCO_3$ precipitation at a level of 1.7 ppm. At three minutes, 10 mg of $CaCO_3$ is added and the pH is recorded. The decrease in pH is directly correlated to the amount of $CaCO_3$ that precipitates. The effectiveness of the inhibition is compared to that of sodium polyacrylate, used commercially for the purpose of preventing scale formation.

Figure 1:
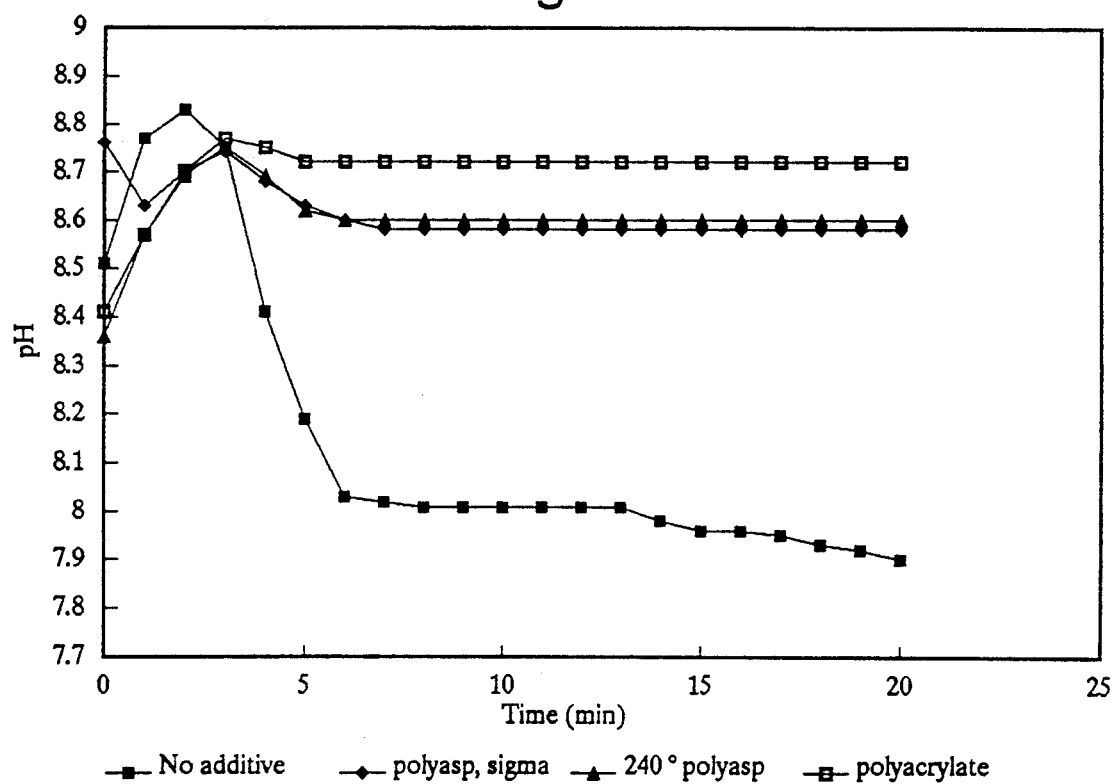
FIG. 1 shows the effect of additives on the inhibition of calcium carbonate precipitation.

FIG. 1 shows the effect of no additive in this test compared with polyacrylate, chemically synthesized L-α-polyaspartate and the polyaspartate prepared in this Example. Both thermally prepared and chemically synthesized polyaspartate were very close to polyacrylate by the calcium drift assay when all materials were tested at 1.7 ppm of additive.

EXAMPLE 2

Thermal Polymerization of Mono-Ammonium Maleate at 145°–150° C.

Following the examples of U.S. Pat. No. 4,839,461, a slurry of 9.8 g (0.1 mole) maleic anhydride was dissolved in 20 ml water at 80°–95° C. and stirred for 30 minutes while allowing the mixture to cool to 25° C. To this colorless solution at 25° C. was added 13 g of 30% aqueous solution of ammonium hydroxide (0.11 mol $NH_3$) to give a colorless solution. This solution was boiled to dryness over a period of 30 minutes at approximately 100°–115° C. to give a white crystalline solid. The solid was tumbled under nitrogen at 100 Torr, at 145°–150° C. for 4 hours to give a water insoluble, pinkish-tan brittle glasslike solid weighing 11.4 g. This solid was dissolved in 26.2 g of an aqueous solution containing 1.36 g of sodium hydroxide to form a clear red-brown solution, pH 7.0, containing 25% solids.

Figure 2:
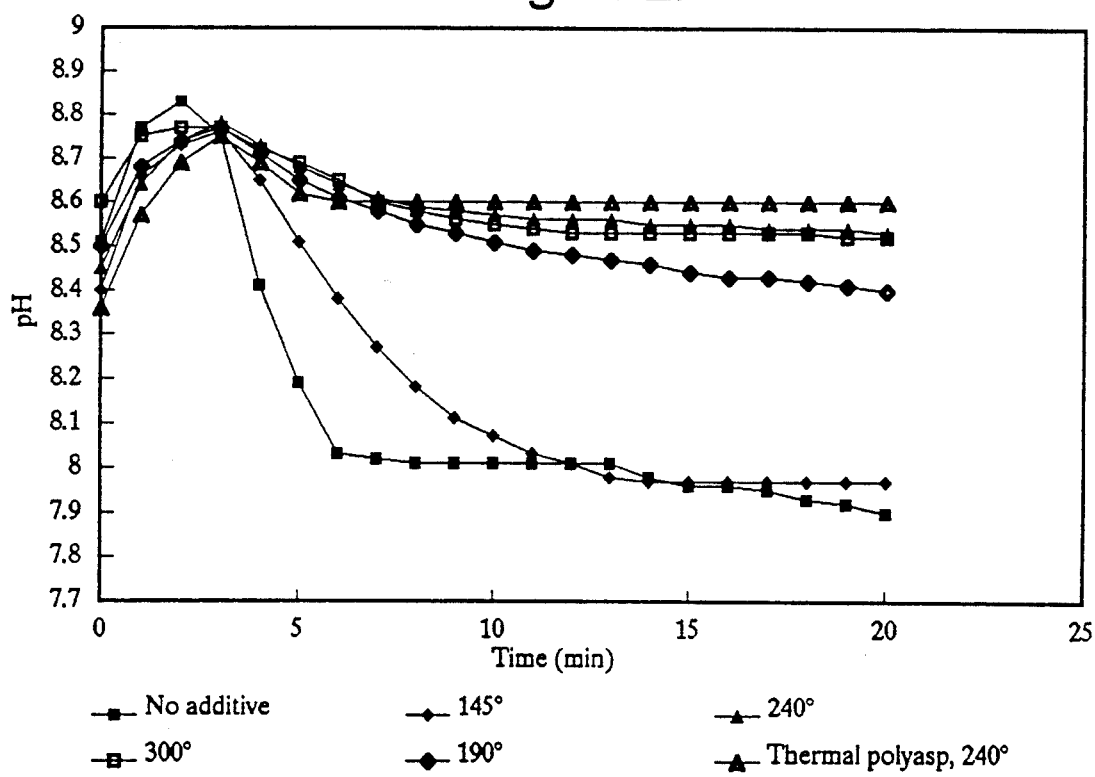
FIG. 2 shows the effect of thermally polymerized mono-ammonium maleate salts as calcium scale inhibitors.

FIG. 2 shows a plot of the data obtained in this example compared to that of the no additive assay and the thermally prepared polyaspartate. The material obtained at 145°–150° C. is no better than no additive when tested at 1.7 ppm.

EXAMPLE 3

Thermal Polymerization of Mono-Ammonium Maleate at 190°–200° C.

A slurry of 9.8 g (0.1 mole) maleic anhydride was dissolved in 20 ml water at 80°–95° C. and stirred for 30 minutes while allowing the mixture to cool to 25° C. To this colorless solution at 25° C. was added 13 g of 30% aqueous solution of ammonium hydroxide (0.11 mol $NH_3$) to give a colorless solution. This solution was boiled to dryness over a period of 30 minutes at approximately 100°–115° C. to give a white crystalline solid. The solid was tumbled under nitrogen at 100 Torr, at 190°–200° C. for 4 hours to give a water insoluble, pinkish-tan brittle glasslike solid weighing 10.6 g. This solid was dissolved in 35.4 g of an aqueous solution containing 1.9 g of sodium hydroxide to form a clear red-brown solution, pH 9.0, containing 25% solids.

FIG. 2 shows that polyaspartic acid of this example in the calcium drift assay of Example 1 at 1.7 ppm much improved compared to the material of Example 2.

EXAMPLE 4

Thermal Polymerization of Mono-Ammonium Maleate at 240°–250° C.

A slurry of 9.8 g (0.1 mole) maleic anhydride was dissolved in 20 ml water at 80°–95° C. and stirred for 30 minutes while allowing the mixture to cool to 25° C. To this colorless solution at 25° C. was added 13 g of 30% aqueous solution of ammonium hydroxide (0.11 mol $NH_3$) to give a colorless solution. This solution was boiled to dryness over a period of 30 minutes at approximately 100°–115° C. to give a white crystalline solid. The solid was tumbled under nitrogen at 100 Torr, at 240°–250° C. for 1.5 hours to give a water insoluble, pinkish-tan brittle glasslike solid weighing 9.6 g. This solid was dissolved in 36.0 g of an aqueous solution containing 4.0 g of sodium hydroxide to form a clear red-brown solution, pH 12.0. To this solution was added 0.25 g citric acid to adjust the pH to 8.5 and the resultant solution contained 25% solids.

FIG. 2 shows that the polyaspartic acid of this example in the calcium drift assay of Example 1 at 1.7 ppm was equivalent to that of thermally prepared polyaspartate.

EXAMPLE 5

Thermal Polymerization of Mono-Ammonium Maleate at 300° C.

A slurry of 9.8 g (0.1 mole) maleic anhydride was dissolved in 20 ml water at 80°-95° C. and stirred for 30 minutes while allowing the mixture to cool to 25° C. To this colorless solution at 25° C. was added 13 g of 30% aqueous solution of ammonium hydroxide (0.11 mol $NH_3$) to give a colorless solution. This solution was boiled to dryness over a period of 30 minutes at approximately 100°-115° C. to give a white crystalline solid. The solid was tumbled at 300° C. for 5 minutes to give a water insoluble, brick-red brittle glasslike solid weighing 9.6 g. This solid was dissolved in 40.0 g of an aqueous solution containing 3.8 g of sodium hydroxide to form a clear red-brown solution, pH 9.0, containing 25% solids.

FIG. 2 shows that the polyaspartic acid of this example in the calcium drift assay of Example 1 at 1.7 ppm was equivalent to that of thermally prepared polyaspartate.

In summary, polyaspartic acid prepared at 145°-150° C. from maleic anhydride and ammonia was ineffective as a scale inhibitor while that prepared at 190°-200° C. was nearly as effective as thermal polyaspartate and that prepared at 240° or 300° C. was equivalent to thermal polyaspartic as a scale inhibitor. The time required for polymerization was reduced from 4-8 hours to between 5 minutes and 1.5 hours, thus providing a significant improvement in the economy of industrial production.

EXAMPLE 6

Thermal Polymerization of Mono-Ammonium Fumarate at 145°-150° C.

Following the examples of U.S. Pat. No. 4,839,461, a slurry of 11.6 g (0.1 mole) fumaric acid was dissolved in 30 ml water was mixed with 13 g of 30% aqueous solution of ammonium hydroxide (0.11 mol $NH_3$). Carefully warming the slurry to boiling gave a clear solution. This solution was boiled to dryness over a period of 15 minutes to give a white crystalline solid. The solid was tumbled under nitrogen at 100 Torr, at 145°-150° C. for 8 hours to give an off-white glasslike solid weighing 13.2 g. This solid was dissolved in 40 g of an aqueous solution containing 4.0 g of sodium hydroxide to form a pale yellow solution, pH 8.5, containing 25% solids.

Figure 3:
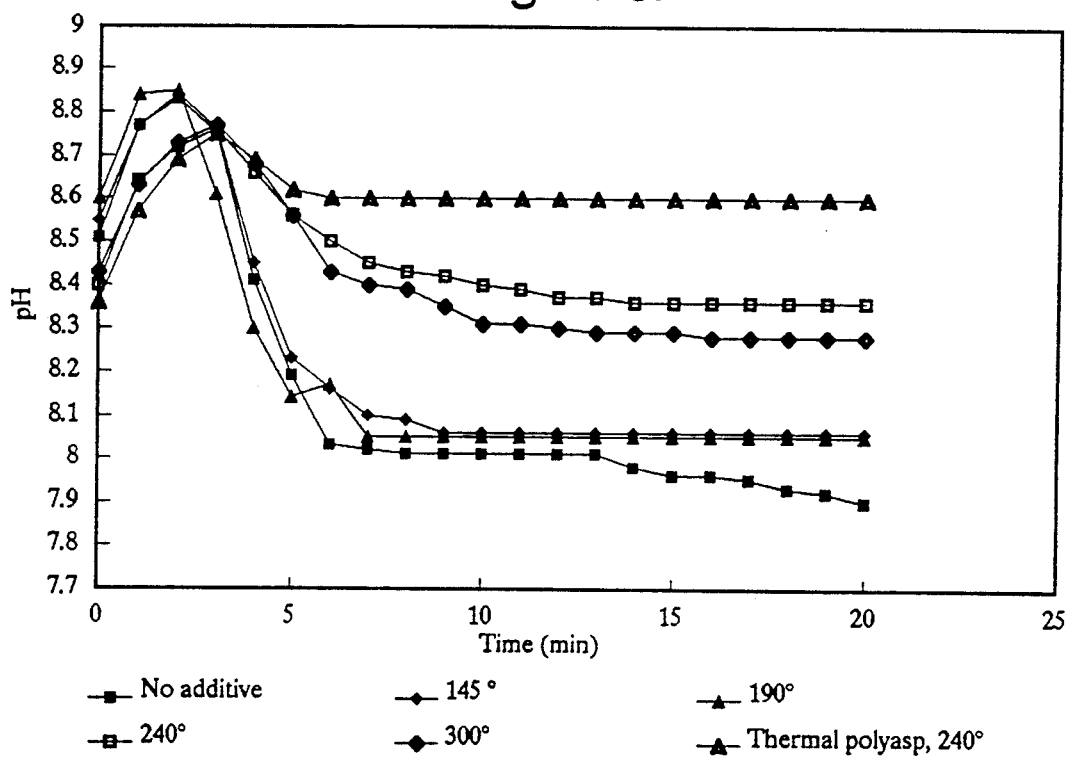
FIG. 3 shows the effect of thermally polymerized mono-ammonium fumarate salts as calcium scale inhibitors.

FIG. 3 shows a plot of the data obtained in the calcium drift assay on the material obtained in this example. The material was only slightly better than no additive when tested at 1.7 ppm.

EXAMPLE 7

Thermal Polymerization of Mono-Ammonium Fumarate at 190°-200° C.

A slurry of 11.6 g (0.1 mole) fumaric acid was dissolved in 30 ml water was mixed with 13 g of 30% aqueous solution of ammonium hydroxide (0.11 mol $NH_3$). Carefully warming the slurry to boiling gave a clear solution. This solution was boiled to dryness over a period of 15 minutes to give a white crystalline solid. The solid was tumbled under nitrogen at 100 Torr, at 190°-200° C. for 4 hours to give a water insoluble, tan glasslike solid weighing 12.0 g. This solid was dissolved in 40 g of an aqueous solution containing 4.0 g of sodium hydroxide to form a pale yellow solution, pH 7.0, containing 25% solids.

FIG. 3 shows a plot of the data obtained in the calcium drift assay on the material obtained in this example. The material was only slightly better than no additive when tested at 1.7 ppm.

EXAMPLE 8

Thermal Polymerization of Mono-Ammonium Fumarate at 240°-250° C.

A slurry of 11.6 g (0.1 mole) fumaric acid was dissolved in 30 ml water was mixed with 13 g of 30% aqueous solution of ammonium hydroxide (0.11 mol $NH_3$). Carefully warming the slurry to boiling gave a clear solution. This solution was boiled to dryness over a period of 15 minutes to give a white crystalline solid. The solid was tumbled under nitrogen at 100 Torr, at 240°-250° C. for 1.5 hours to give a water insoluble, dark brown glasslike solid weighing 9.3 g. This solid was dissolved in 40 g of an aqueous solution containing 4.0 g of sodium hydroxide to form a clear brown solution, pH 8.0, containing 25% solids.

FIG. 3 shows a plot of the data obtained in the calcium drift assay on the material obtained in this example. The material was much better than that prepared in Example 6 when tested at 1.7 ppm.

EXAMPLE 9

Thermal Polymerization of Mono-Ammonium Fumarate at 300° C.

A slurry of 11.6 g (0.1 mole) fumaric acid was dissolved in 30 ml water was mixed with 13 g of 30% aqueous solution of ammonium hydroxide (0.11 mol $NH_3$). Carefully warming the slurry to boiling gave a clear solution. This solution was boiled to dryness over a period of 15 minutes to give a white crystalline solid. The solid was tumbled at 300° C. for 5 minutes to give a water insoluble, dark brown glasslike solid weighing 9.8 g. This solid was dissolved in 40 g of an aqueous solution containing 3.8 g of sodium hydroxide to form a clear brown solution, pH 9.0, containing 25% solids.

FIG. 3 shows a plot of the data obtained in the calcium drift assay on the material obtained in this example. The material was much better than that prepared in Example 6 when tested at 1.7 ppm.

In summary, thermally polymerized mono-ammonium fumarate provided polyaspartate prepared at 145°-150° C. and at 190°-200° C. which was only slightly active in scale inhibition while that prepared at 240° C. and at 300° C. were active but less active than thermal polyaspartate as scale inhibitors.

EXAMPLE 10

Thermal Polymerization of Di-Ammonium Maleate at 135°-140° C.

Following the examples of U.S. Pat. No. 4,839,461, a solution of 1.96 g (0.02 mole) maleic anhydride was dissolved in 1 ml water at 50°-60° C. and stirred for 30 minutes while allowing the mixture to cool to 25° C. To this colorless solution at 25° C. was added 2.4 g of 30% aqueous solution of ammonium hydroxide (0.022 mol NH₃) to give a colorless solution. This solution was boiled to dryness over a period of 30 minutes at approximately 100°-120° C. and 10-20 Torr, to give a white crystalline solid. The solid was tumbled under nitrogen at 100 Torr, at 135°-140° C. for 8 hours to give a water insoluble, pinkish-tan brittle glasslike solid weighing 2.7 g. This solid was dissolved in 6.6 g of an aqueous solution containing 0.8 g of sodium hydroxide to form a clear orange solution, pH 7.0, containing 25% solids.

Figure 4:
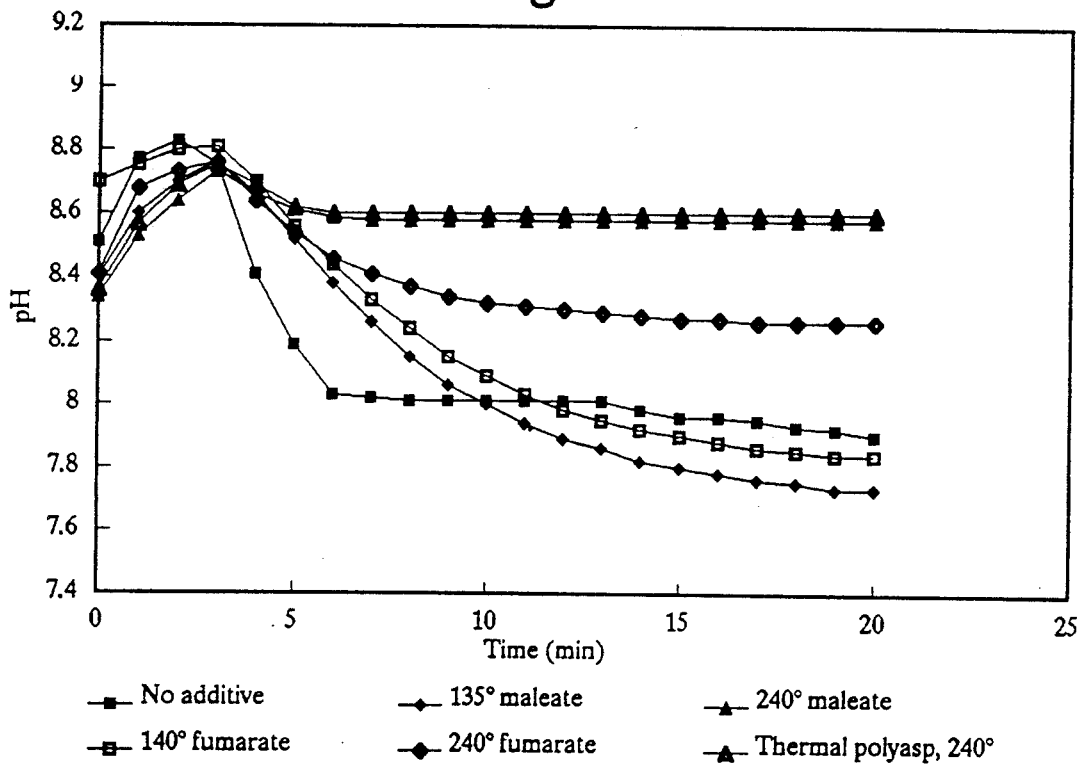
FIG. 4 shows the effect of thermally polymerized di-ammonium fumarate and maleate salts as calcium scale inhibitors.

FIG. 4 shows a plot of the data obtained in this example compared to that of the no additive assay and the thermally prepared polyaspartate. The material obtained at 135°-145° C. is not as good as no additive when tested at 1.7 ppm.

EXAMPLE 11

Thermal Polymerization of Di-Ammonium Maleate at 240°-250° C.

A solution of 9.8 g (0.1 mole) maleic anhydride was dissolved in 20 ml water at 50°-60° C. and stirred for 30 minutes while allowing the mixture to cool to 25° C. To this colorless solution at 25° C. was added 26 g of 30% aqueous solution of ammonium hydroxide (0.22 mol NH₃) to give a colorless solution. This solution was boiled to dryness over a period of 30 minutes at approximately 100°-120° C. and 10-20 Torr, to give a white crystalline solid. The solid was tumbled under nitrogen at 100 Torr, at 240°-250° C. for 1.5 hours to give a water insoluble, red-brown brittle glasslike solid weighing 9.4 g. This solid was dissolved in 40 g of an aqueous solution containing 3.8 g of sodium hydroxide to form a clear red-brown solution, pH 7.0, containing 25% solids.

FIG. 4 shows a plot of the data obtained in this example compared to that of the no additive assay and the thermally prepared polyaspartate. The material of this example is equivalent to that of thermal polyaspartate when tested at 1.7 ppm.

EXAMPLE 12

Thermal Polymerization of Di-Ammonium Fumarate at 140°-150° C.

A slurry of 11.6 g (0.1 mole) fumaric acid was dissolved in 30 ml water was mixed with 26 g of 30% aqueous solution of ammonium hydroxide (0.22 mol NH₃). Carefully warming the slurry to boiling gave a clear solution. This solution was boiled to dryness over a period of 15 minutes to give a white crystalline solid. The solid was tumbled under nitrogen at 100 Torr, at 140°-150° C. for 8 hours to give a water insoluble, brown, glasslike solid weighing 14 g. This solid was dissolved in 100 g of an aqueous solution containing 2.0 g of sodium hydroxide to form a pale yellow solution, pH 7.0, containing 25% solids.

FIG. 4 shows a plot of the data obtained in the calcium drift assay on the material obtained in this example. The material was only slightly better than no additive when tested at 1.7 ppm.

EXAMPLE 13

Thermal Polymerization of Di-Ammonium Fumarate at 235°-245° C.

A slurry of 11.6 g (0.1 mole) fumaric acid was dissolved in 30 ml water was mixed with 26 g of 30% aqueous solution of ammonium hydroxide (0.22 mol NH₃). Carefully warming the slurry to boiling gave a clear solution. This solution was boiled to dryness over a period of 15 minutes to give a white crystalline solid. The solid was tumbled under nitrogen at 100 Torr, at 235°-245° C. for 1.5 hours to give a water insoluble, brown, glasslike solid weighing 9.0 g. This solid was dissolved in 100 g of an aqueous solution containing 2.0 g of sodium hydroxide to form a pale yellow solution, pH 8.5, containing 25% solids.

FIG. 4 shows a plot of the data obtained in the calcium drift assay on the material obtained in this example. The material was only slightly better than no additive when tested at 1.7 ppm.

EXAMPLE 14

Molecular Weight Analysis of Polyaspartate Prepared in Various Ways

Molecular weight determination of the materials prepared in the foregoing examples and commercially available materials was made by chromatography on a 1 cm × 18 cm, Sephadex G-50 column in a mobile phase of 0.02M sodium phosphate buffer, pH 7.0, running at 0.5 ml/min, with detection in the UV at 240 nm. The sample size ranged from 0.01 to 0.5 mg/ml.

Figure 5:
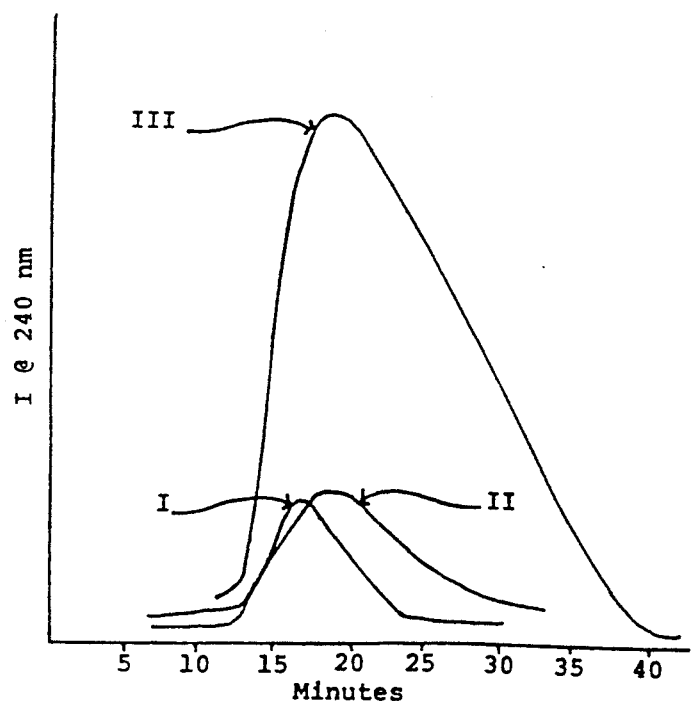
FIG. 5 shows the calibration of a molecular weight column.

FIG. 5 shows the results of sodium polyaspartate, 13,000 m.w., from Sigma, I; sodium polyaspartate, 7,500 m.w., from Sigma, II; and sodium polyaspartate, Example 1, II. m.w. 5,000, from Sigma.

Figure 6:
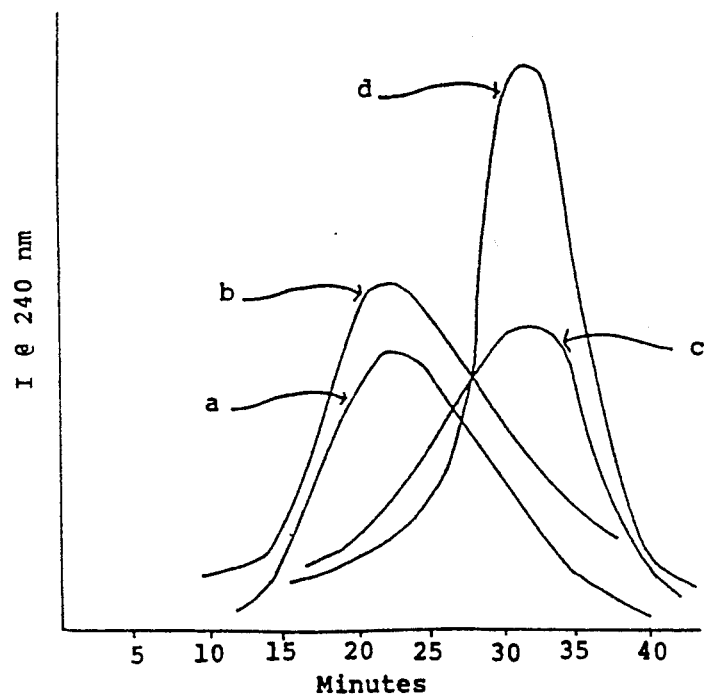
FIG. 6 shows the molecular weight determination of polymers formed in Examples 2, 4, 10, and 11.

FIG. 6 shows the result of Example 4 as "a"; Example 11 as "b"; Example 2 as "c" and Example 10 as "d". With maleic acid and ammonia reactions, temperatures of 240° C. gave molecular weights over a broad range centered at 7,000-8,000 while temperatures of 135°-150° C. gave molecular weights over a broad range centered at 2,000.

Figure 7:
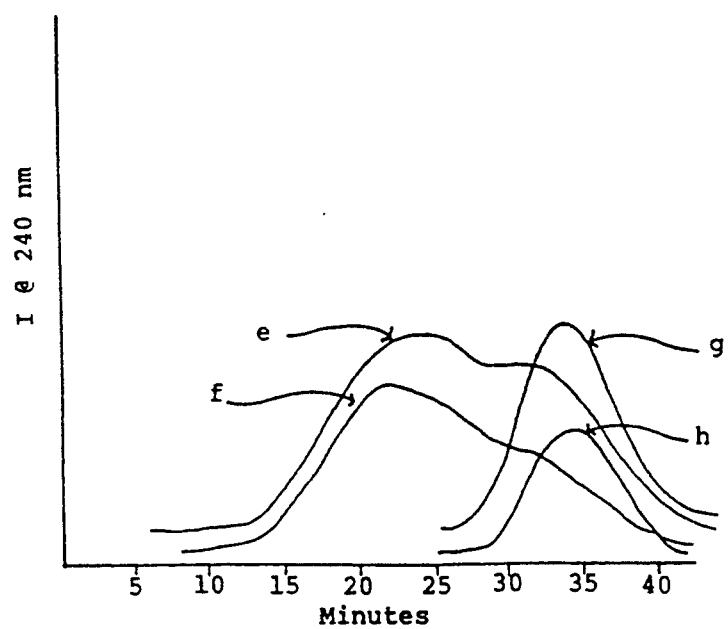
FIG. 7 shows the molecular weight determination of polymers formed in Examples 6, 8, 12, and 13.

FIG. 7 shows the result of Example 8 as "e"; Example 13 as "f"; Example 6 as "g" and Example 12 as "h". With fumaric acid and ammonia reactions, temperatures of 240° C. gave molecular weights over a broad range centered at 7,000-8,000 while temperatures of 140°-150° C. gave molecular weights over a broad range centered at 2,000.

Figure 8:
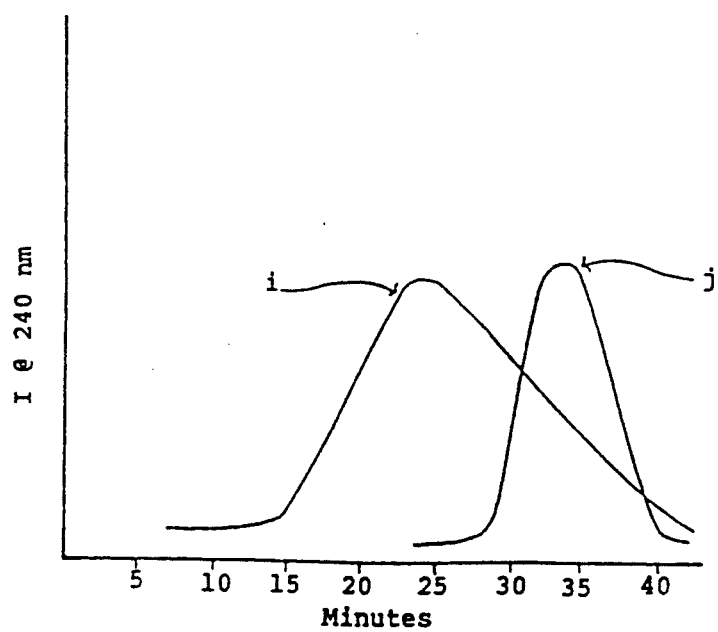
FIG. 8 shows the molecular weight determination of polymers formed in Examples 3 and 7.

FIG. 8 shows the result of Example 3 as "i"; Example 7 as "j". Temperatures of 190°-200° C. gave molecular weights for maleate over a broad range centered at 7,000-8,000 while temperatures of 190°-200° C. for fumarate gave molecular weights over a broad range centered at 2,000.

EXAMPLE 15

Continuous Production of Polyaspartic Acid

A ZE25 twin screw extruder made by Berstorff, Charlotte, N.C. was set up with six barrel sections and the first two were held at 160° C. and the last four at 200° C. A 70% solution of monoammonium maleate in water was fed into the extruder which was turning at 100 RPM at a rate of 4 lbs/hr. The calculated residence time of the ammonium maleate/polysuccinimide at this rate was approximately 45 seconds. The product was hydrolyzed with sodium hydroxide as in Example 5. The resulting product was tested for activity in the CaSO₄ assay. The sodium polyaspartate gave a precipitate of 30 mg and the blank control gave a precipitate of 80 mg. The molecular weight analysis gave a broad peak with a maximum at 23 minutes.

I claim:

1. A process for the preparation of a salt of polyaspartic acid comprising reacting maleic acid and ammonia in a molar ratio of 1:1-2.1 at 190°-350° C., for a time of four hours or less and converting the resultant polymer into a salt by adding an alkaline-earth or alkali metal hydroxide or ammonium hydroxide.

2. The process of claim 1 wherein the reaction is at 200°–300° C.

3. The process of claim 1 wherein the reaction is at 240°–300° C.

4. The process of claim 1 wherein the alkali earth hydroxide is sodium hydroxide.

5. A process for the preparation of a salt of polyaspartic acid comprising reacting fumaric acid and ammonia in a molar ratio of 1:1–2.1 at 200°–300° C. and converting the resultant polymer into a salt by adding an alkaline-earth or alkali metal hydroxide or ammonium hydroxide.

6. The process of claim 5 wherein the reaction is at 240°–300° C.

7. The process of claim 5 wherein the alkali metal hydroxide is sodium hydroxide.

8. A process for the preparation of a salt of polyaspartic acid comprising extruding an aqueous solution of monoammonium maleate at 160°–200° C. and converting the resultant polymer into a salt by adding an alkaline-earth or alkali metal hydroxide or ammonium hydroxide.

9. The process of claim 8 wherein the alkali metal hydroxide is sodium hydroxide.

* * * * *